US008224683B2

(12) United States Patent
Manos (10) Patent No.: US 8,224,683 B2
(45) Date of Patent: Jul. 17, 2012

(54) INFORMATION TECHNOLOGY SERVICE REQUEST LEVEL OF SERVICE MONITOR

(75) Inventor: John Manos, Rochester, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2460 days.

(21) Appl. No.: 10/615,054

(22) Filed: Jul. 8, 2003

(65) Prior Publication Data

US 2005/0010461 A1    Jan. 13, 2005

(51) Int. Cl.
*G06Q 10/00* (2012.01)
(52) U.S. Cl. ..................................... 705/7.15
(58) Field of Classification Search .................. 705/7.15
See application file for complete search history.

(56) References Cited

U.S. PATENT DOCUMENTS

| | | | | |
|---|---|---|---|---|
| 6,032,184 | A * | 2/2000 | Cogger et al. ..................... | 705/8 |
| 6,219,648 | B1 * | 4/2001 | Jones et al. ........................ | 705/8 |
| 6,516,055 | B1 | 2/2003 | Greene, Jr. et al. | |
| 2001/0001143 | A1 | 5/2001 | Bollinger et al. | |
| 2002/0123983 | A1 * | 9/2002 | Riley et al. ........................ | 707/1 |
| 2003/0221005 | A1 * | 11/2003 | Betge-Brezetz et al. ..... | 709/224 |

OTHER PUBLICATIONS

Sheifler et al. The X Window System, ACM Transaction on Graphics, vol. 5, No. 2, Apr. 1996.*
Quercia et al. The Definitive Guides to the X Window System, O'Reilly & Associates, Inc. Volume Three, Motif Edition, 1993.*
e11online helpdesk management solution or customer relationship management for your business (http://web.archive.org/web/20010725052008/http://www.e11online.com) 2001.*
Altiris (http://web.archive.org/web/20011201010026/http://altiris.com) 2001.*
Tsykin, Automated Service Level Reporting: Experience of Implementation, Fujitsu Australia, 2000.*
Lafferty et al., Information Problems Tackled through Service Level Agreements, Optimum Online The Journal of Public Sector Management, Jun. 2002.*
LaBounty, How to establish and maintain service level agreements, Help Desk Institute, 2002.*
Ward et al., A generic SLA Semantic Model for the Execution Management of e-Business Outsourcing Contracts, Proceedings of the Third International Conference on E-Commerce and Web Technologies, 2002.* Szymczyk, Developing Service Level Agreement for Outsourced Processes and Systems, International Carpathian Control Conference ICCC, May 27-30, 2002.*
Karten, Excerpt from How to establish Service Level Agreements, www.nkarten.com, 2001.*
Larson, The role of service level agreements in IT service delivery, Information Management & Computer Security, 1998.*

* cited by examiner

*Primary Examiner* — Andre Boyce
*Assistant Examiner* — Nadja Chong Cruz (57) ABSTRACT

A method, system, and computer program product for monitoring service tickets for information technology (IT) service providers to ensure that levels of service regarding resolving problems identified by a customer are met is provided. In one embodiment, a monitoring server inspects a service ticket in a database to determine a deadline for when a problem associated with the service ticket must be resolved. The server then determines a deadline approaching alert time. This deadline approaching alert time is a time at which a help desk user must be notified that the deadline for resolving the problem must be met is approaching. The server then alerts the help desk user that the deadline for resolving the problem is approaching when the deadline approaching alert time is reached. If the problem is not resolved by the deadline, the server periodically alerts the help desk user when times for status updates, which have been specified by a level of service agreement for updating the customer of the status of resolution of problems that have past deadline, are approaching, thereby ensuring that the IT provider meets its obligations to the customer.

37 Claims, 7 Drawing Sheets

| Steps | Time | Description |
|---|---|---|
| 1. | 9:30am | Customer calls helpdesk reporting their HP Server is down. |
| 2. | 9:32am | Helpdesk creates an 01-Outage ticket and assigns a severity of '01-Platinum' The resolution time to fix the problem is 4 hours The status frequesncy (in case problem is not resolved by LOS) is 30 mins<br><br>*Multiple severities exist in Asset Center, therefore, each will have a different resolution time and status frequency values.* |
| 3. | 9:35am | Ticket is dispatched to a systems engineer.<br>The LOS due date is calculated:  9:35 + 4 hours = 1:35pm LOS Due Date |
| 4. | 1:35pm | The problem is still not resolved and LOS is missed. Now the helpdesk is required to status the customer every 30 mins until problem is resolved.<br>Status by 2:05pm = 1:35pm + 30 mins |
| 5. | 1:55pm | Helpdesk agent communicates status to customer. The next status by date is 30 minutes from the last status communication.<br>Status by 2:25pm = 1:55pm + 30 mins |
| 6. | 2:15pm | Problem is resolved and helpdesk closes ticket. |

INFORMATION TECHNOLOGY SERVICE REQUEST LEVEL OF SERVICE MONITOR

BACKGROUND OF THE INVENTION

1. Technical Field

The present invention relates generally to the field of computer software and, more specifically, to monitoring customer service requests for an information technology system.

2. Description of Related Art

With the wealth of information that is now available and the ease of access to this information that is provided by computers, many, if not most, businesses utilize computer extensively to enable them to provide their goods and/or services to their consumers efficiently, to monitor company assets, to target marketing campaigns to the appropriate consumer audience, as well as enumerable other users. Computers and networks, in order to accomplish these objectives, have become increasingly complex so that more of these tasks may be automated as well as providing the businesses with the ability to perform tasks not possible to do by humans that improve the businesses net income.

However, most businesses are not in the "computer" or "information technology" business. In order to improve their efficiency, rather than hire and train its own information technology staff, many businesses choose to contract to information technology (IT) specialists to install and maintain appropriate computer and network hardware and software necessary for the business to achieve its business objectives. These contracts, among other things, specify the level of service of the information technology components that must be maintained by the IT provider such that the business is able to function effectively. Typically, the contract requires the IT provider to maintain a helpdesk to which the business' employees may call to notify the IT provider of problems with the computer system, network, or software.

The helpdesk agent assigns each reported problem a service ticket. The type of problem and severity of the problem allows the helpdesk agent, with reference to the contract, to determine the time frame in which the problem must be resolved. The contracts also typically call for the IT provider to periodically provide a status update to the business for problems that have not been resolved by their specified due date. Failure to meet these due dates and status updates may cause the IT provider to suffer severe monetary or other penalties as prescribed by the contract.

However, when the IT provided to the business is very large and complex, which is often the case, there may be many things that can go wrong requiring the IT provider to service. Thus, at any given time, there may be numerous tickets in the system requiring monitoring. Because of the multitude of tickets and the fact that different tickets have different due dates and status update requirements, it is not unusual that a help desk user may miss certain deadlines. Therefore, it would be desirable to have a service ticket monitoring system that will alert the help desk user when certain important tasks are approaching, thereby enabling the help desk user to perform his/her task more efficiently.

Managers of the helpdesk can also monitor the level of service. For example, if the managers login to the system and see an unusual amount of calls, they can take action such as, for example: increase staff for a shift, determine why so many callas are coming in (e.g., virus), or simply be aware of the call volume for the helpdesk. Managers can also login to the system to determine if the helpdesk agents are performing their tasks quickly and efficiently.

SUMMARY OF THE INVENTION

The present invention provides a method, system, and computer program product for monitoring service tickets for information technology (IT) service providers to ensure that levels of service regarding resolving problems identified by a customer are met. In one embodiment, a monitoring server inspects a service ticket in a database to determine a deadline for when a problem associated with the service ticket must be resolved. The server then determines a deadline approaching alert time. This deadline approaching alert time is a time at which a help desk user must be notified that the deadline for resolving the problem must be met is approaching. The server then alerts the help desk user through a client program that the deadline for resolving the problem is approaching when the deadline approaching alert time is reached. If the problem is not resolved by the deadline, the server periodically alerts the help desk user when times for status updates, which have been specified by a level of service agreement for updating the customer of the status of resolution of problems that have past deadline, are approaching, thereby ensuring that the IT provider meets its obligations to the customer.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
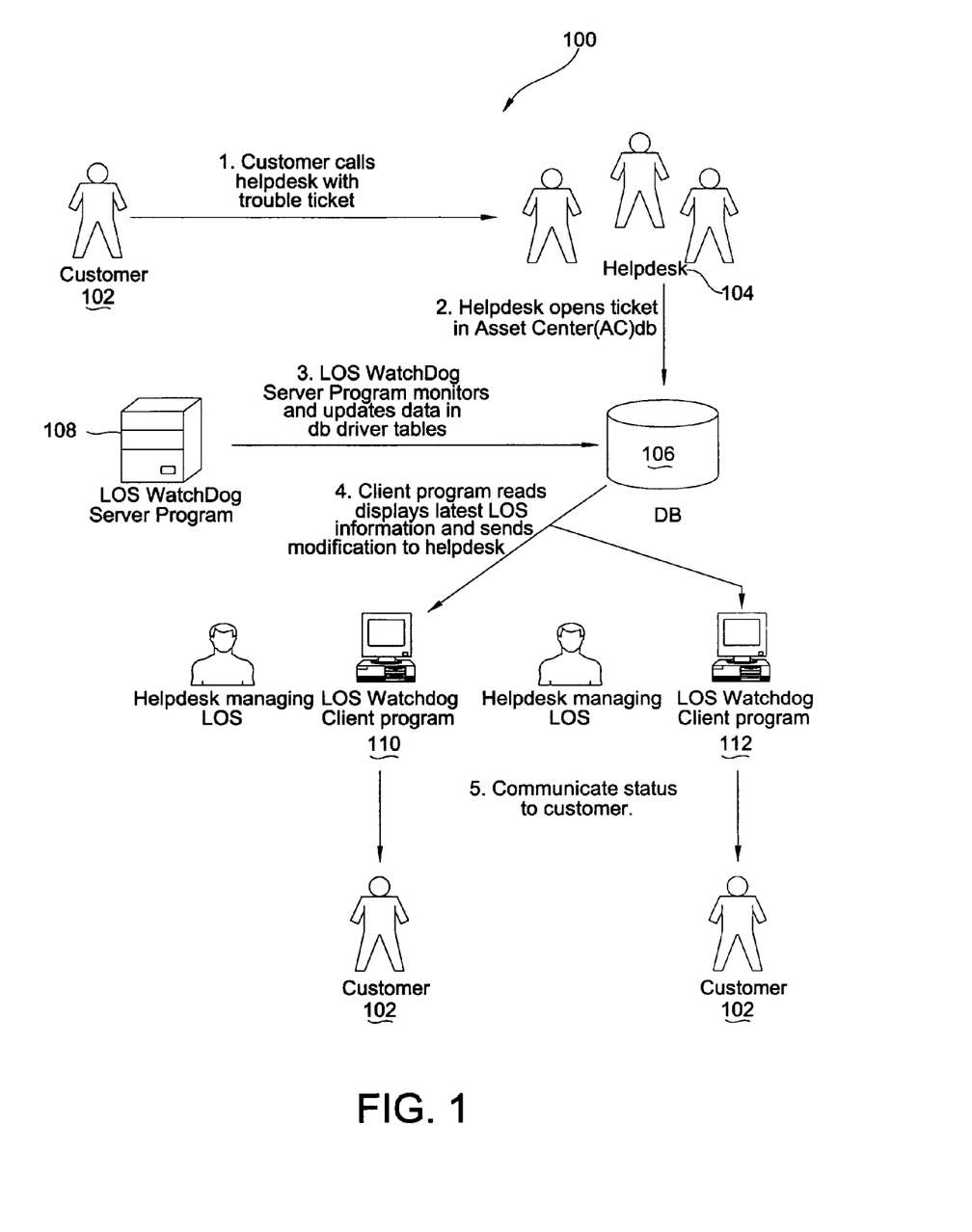
FIG. 1 depicts a pictorial representation of a information technology customer service request level of service (LOS) monitoring system in accordance with one embodiment of the present invention.

With reference now to the figures, and in particular with reference to FIG. 1, a pictorial representation of a information technology customer service request level of service (LOS) monitoring system is depicted in accordance with one embodiment of the present invention. In order to ensure that an information technology (IT) provider meets its customers expectations as set forth in a Level-of-Service (LOS) agreement, monitoring system 100 monitors service tickets to ensure that each service ticket is responded to as agreed to in the contract with the customer. A service ticket is an entry created within the monitoring system 100 (or, alternatively, by some external application) that describes a problem that the customer 102 has had with a certain aspect of the information technology provided by the IT provider. The service ticket indicates the nature of the problem and specifies the time period in which the problem must be resolved as well as status update time frames that must be met if the IT provider is unable to resolve the problem within the specified time period.

In one embodiment, when a customer 102 determines that there is a problem with the information technology for which the IT provider is responsible, the customer 102 calls an IT help desk user 104 with a trouble or service request ticket. The IT help desk user 104 opens a ticket in a database 106, such as, for example, an Oracle database. In one example, as depicted in FIG. 1, the IT provided could be an Asset Center.

A server 108 running a monitor program, which is referred to herein as a Level-of-Service Watchdog program or LOS Watchdog program, monitors and updates data in one or more tables contained within database 106.

Figure 2:
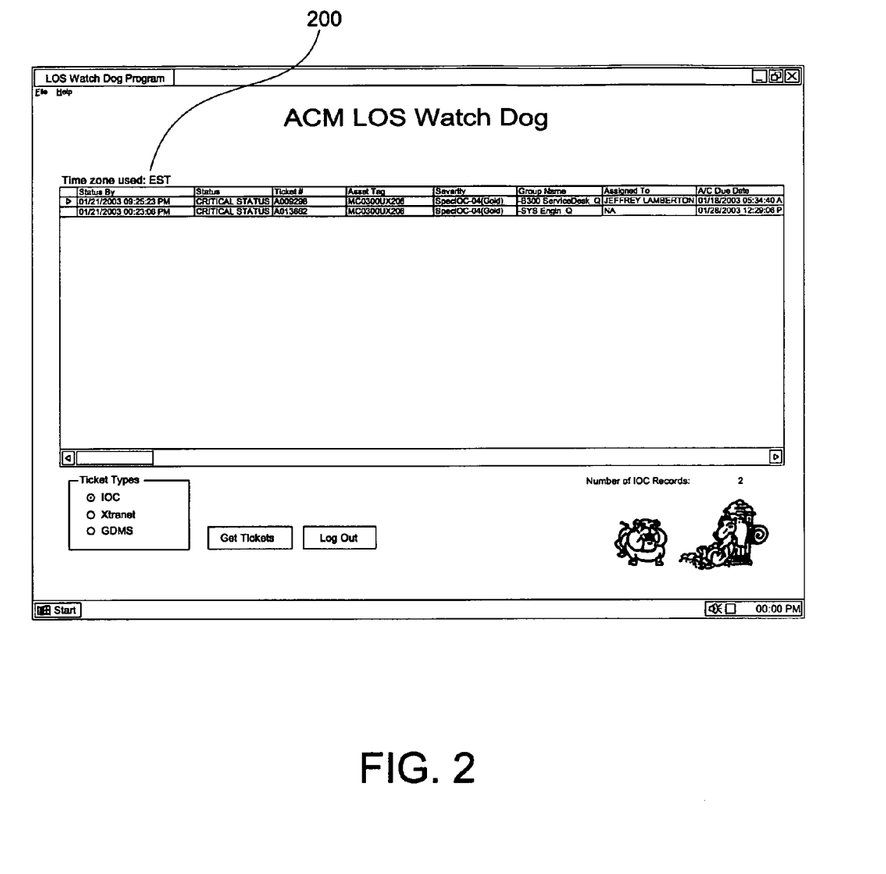
FIG. 2 depicts an exemplary monitoring grid that may be displayed to a helpdesk user on the user's data processing system.
Figure 3A:
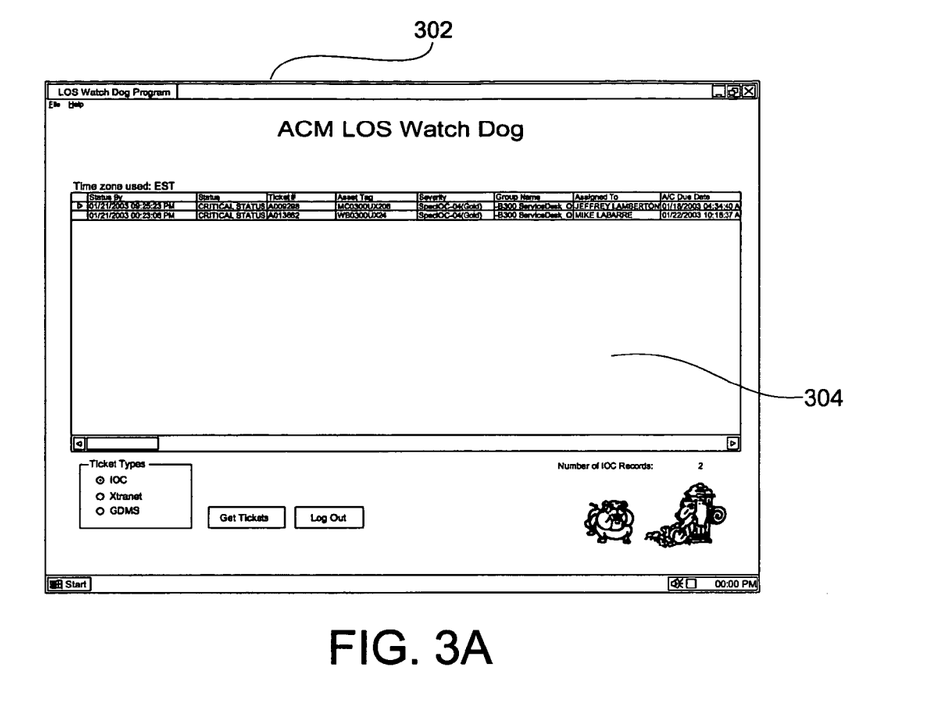
FIGS. 3A-3B depict examples of an alert that may be displayed to a helpdesk user.
Figure 3B:
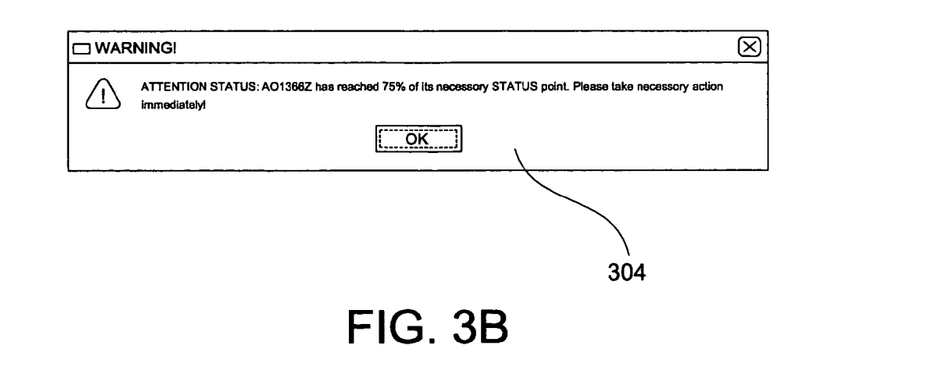

The helpdesk/clients 110 and 112 program displays a grid populated with tickets that have reached a specified percentage of the time before their due date, for example, 75% of LOS due date, or with tickets already past LOS. An example of such a grid 200 is displayed in FIG. 2. The grid 200 clearly shows which of these two categories the ticket falls under and gives recommended times for the helpdesk agent 104 to perform an action (i.e. giving status to a customer). The helpdesk program can be minimized in the background to allow helpdesk agents 104 to continue working on their day-to-day responsibilities. When a ticket reaches a specified time limit, for example, 75% of the LOS due date, or it reaches a specified time period before a necessary status update, for example, 75% of a necessary status update, an alert (visual and/or audio) message window will pop up and appear above whatever application the helpdesk agent 104 is working on. Alert 304 depicted on top of ACM LOS Watch Dog window 302 depicted in FIG. 3A is an example of such an alert. A more detailed picture of alert 304 is depicted in FIG. 3B.

When a helpdesk agent 104 initially starts the LOS Watchdog program, they click on, for example, the "Get Tickets" button which starts the monitoring process. The LOS Watchdog program continuously checks for tickets that require attention from a helpdesk agent 104 periodically, for example, every 5 minutes. This eliminates the need of having the helpdesk agent 104 continuously click on the "Get Tickets" button to fetch the latest information. Also, each client 110 and 112 program works off of the database 106 time so alert messages are displayed in synchronization for all helpdesk clients 104.

When a helpdesk user 104 receives a notification, a record is inserted into a table, such as, for example, an Oracle table, that records what time the message was received, what text was displayed and the user who received it. This is a way for upper management to audit their employees and their responses. Additionally, when the helpdesk agent logs in an out from the monitoring system, the times they did so are recorded. Thus, for example, if a manager wishes to determine if the morning shift was actually logged into the monitoring system, the manager can view the help desk agent's log file to verify the agent's activity.

The server program of the monitoring system resides on, for example, an NT4.0 platform and typically runs 24 hours a day, seven days a week. The server program updates the tables and checks for any updates periodically, such as, for example, every 60 seconds. The client program reads the latest information from the tables periodically, such as, for example, every 5 minutes and refreshes the grid appropriately. Both client and server program have been tested on NT4.0, WIN2000, and XP.

There are three tables that are used for the LOS WatchDog program. The first table, "Matrix Table", contains a list of severities that need to be monitored by the program, their resolution and status frequency times and other information. The second table, "History Table", records which helpdesk agents received alert notifications, the time they received them and the exact message that was displayed on their screen. The third table, "Driver Table", is the heart of the LOS WatchDog program. This table contains a list of tickets that were opened with a severity that exists in the "Matrix Table". The client program reads from this table and updates the grid and sends alerts as necessary. The server program updates the "Driver Table" whenever certain conditions are met. Database triggers are responsible for inserting records into the table whenever a ticket is created that has a severity that exists in the "Matrix Table".

The monitoring system of the present invention helps agents 104 focus more on their day to day activities rather than exerting manual effort to effectively manage Level of Service guaranteed to the customer 102. Knowing that the monitoring program will notify him/her and their team when a ticket requires prompt attention, the helpdesk can concentrate on better servicing the customer and reduce the volume of tickets missing Level of Service agreements. Upper management also has the capability to view and monitor the volume of tickets that are missing LOS as well.

FIG. 1 is intended as an example and not as an architectural limitation for the processes of the present invention.

Figure 4:
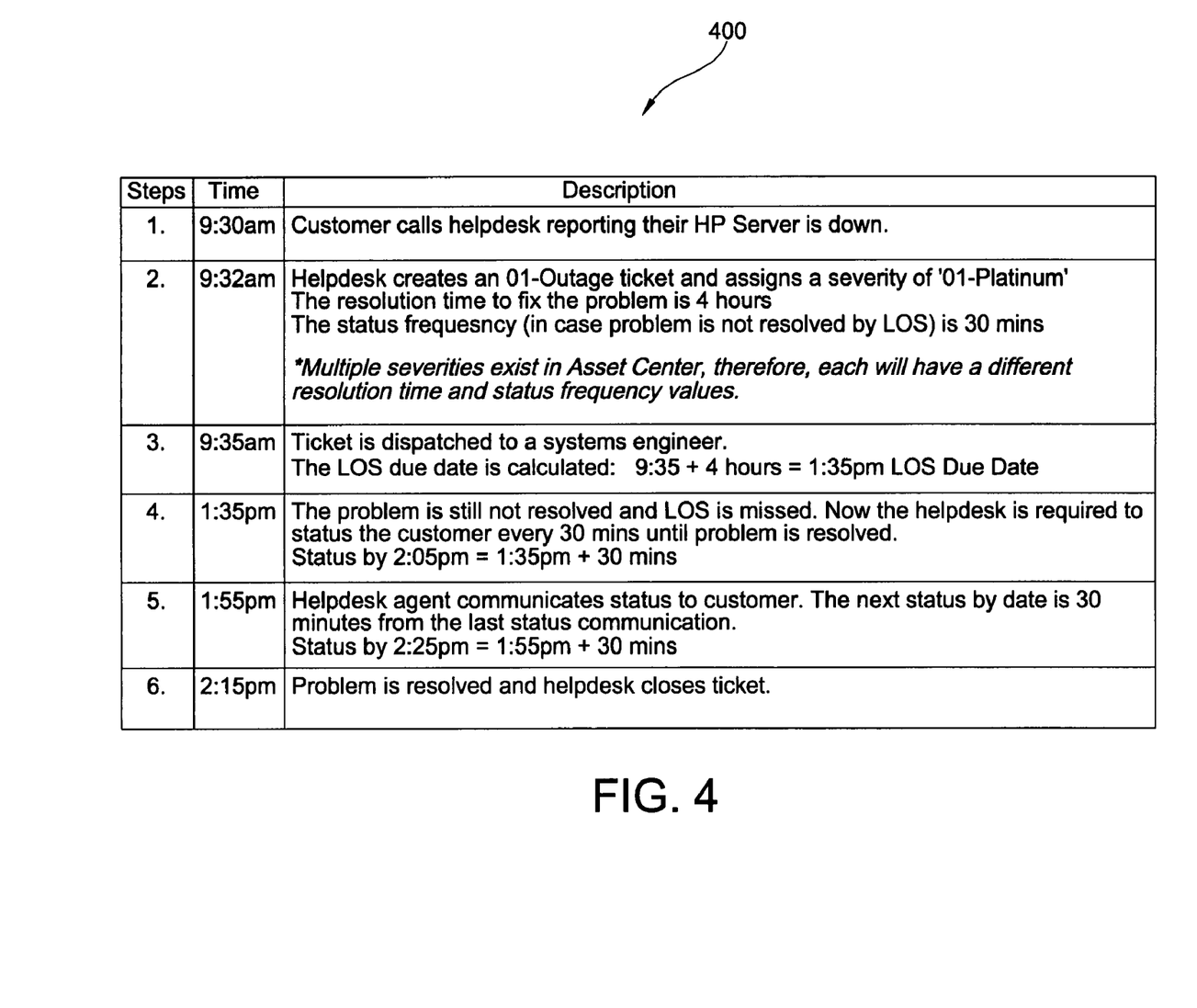
FIG. 4 depicts a table showing an exemplary time line illustrating the life of a service ticket in accordance with one embodiment of the present invention.

Referring now to FIG. 4, a table 400 showing an exemplary time line illustrating the life of a service ticket is depicted in accordance with the present invention. In this example, at 9:30 a.m., a customer 102 calls the helpdesk user 104 reporting that their HP server is down. At 9:32 a.m., the helpdesk user 104 creates an 01-Outage ticket and assigns a severity of "01-Platinum" to the ticket. The severity assign to a ticket is typically obtained from a severity table that has been populated based on a contractual agreement between the IT provider and the customer. Also, at 9:32 a.m., the resolution time to fix the problem is obtained based on the LOS agreement, which in the present example is determined to be 4 hours. The status update frequency to update the customer in case the problem is not resolved by the LOS due time is 30 minutes. This status update frequency is also determined by the contract between the customer and the IT provider.

At 9:35 a.m., the ticket is dispatched to a systems engineer for resolution. The LOS due date is calculated as 9:35 a.m. plus 4 hours. Thus, the LOS due date is 1:35 p.m. of the same date. At 12:35 p.m., the problem is still not resolved and the helpdesk user is alerted that the due date for the ticket is approaching. At 1:35 p.m., the problem is still not resolved and the due date is missed. According to the LOS agreement under which this ticket has been created, the helpdesk 104 is required to notify the customer 102 every 30 minutes until the problem is resolved.

At 1:55 p.m., the helpdesk agent 104 communicates the current status of the problem resolution to the customer 102. The next status update is due 30 minutes from the last status communication. Thus, the next status update is due at 2:25 p.m. However, before the next status update is due, the problem is resolved at 2:15 p.m. and the helpdesk 104 closes the ticket.

Figure 5:
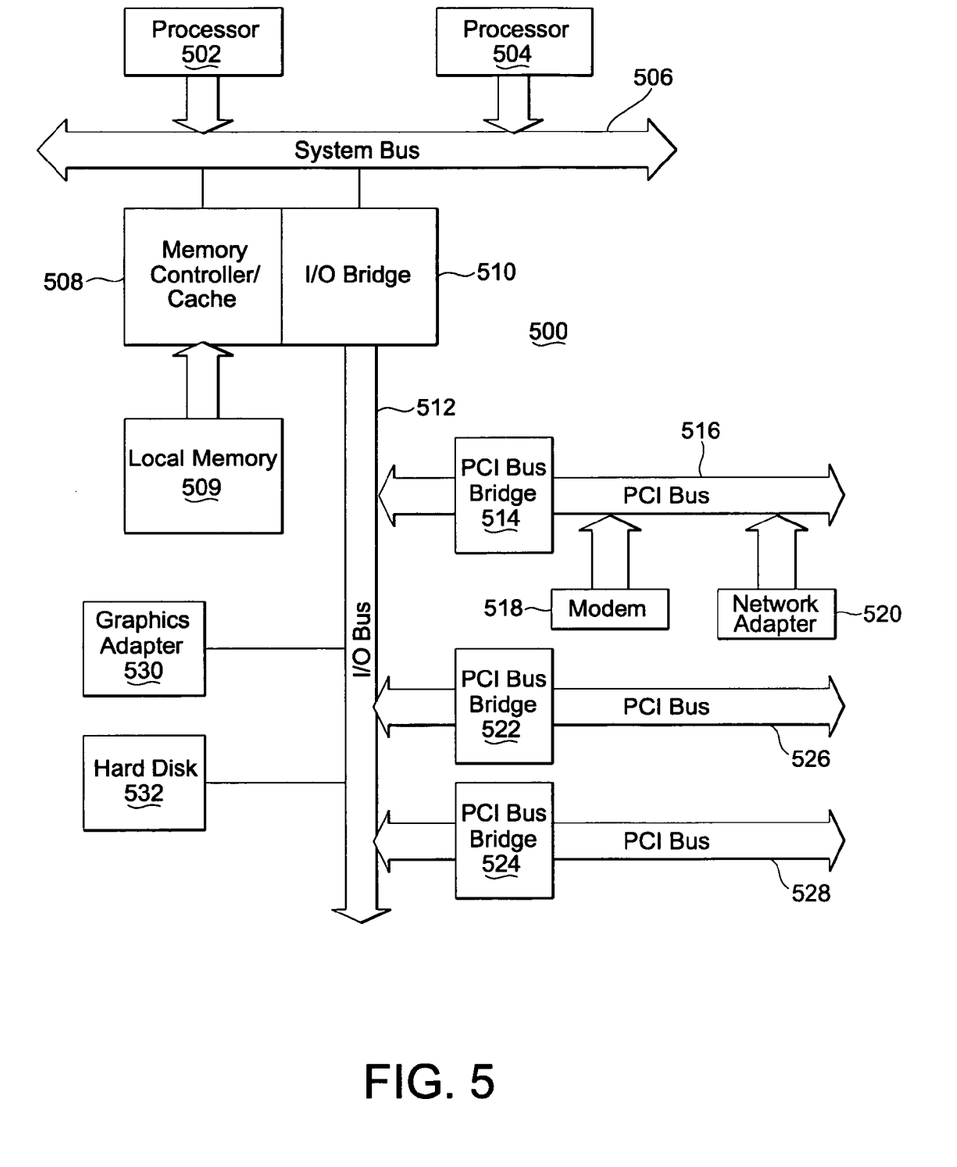
FIG. 5 depicts a block diagram of a data processing system which may be implemented as a monitoring server in accordance with the present invention.

Referring to FIG. 5, a block diagram of a data processing system which may be implemented as a server, such as server 108 in FIG. 1, is depicted in accordance with the present invention. The server monitoring software of the present invention may be implemented on data processing system 500. Data processing system 500 may be a symmetric multiprocessor (SMP) system including a plurality of processors 502 and 504 connected to system bus 506. Alternatively, a single processor system may be employed. Also connected to system bus 506 is memory controller/cache 508, which provides an interface to local memory 509. I/O bus bridge 510 is connected to system bus 506 and provides an interface to I/O bus 512. Memory controller/cache 508 and I/O bus bridge 510 may be integrated as depicted.

Peripheral component interconnect (PCI) bus bridge 514 connected to I/O bus 512 provides an interface to PCI local bus 516. A number of modems 518-520 may be connected to PCI bus 516. Typical PCI bus implementations will support four PCI expansion slots or add-in connectors. Communications links to database 106 and clients 110 and 112 in FIG. 1 may be provided through modem 518 and network adapter 520 connected to PCI local bus 516 through add-in boards.

Additional PCI bus bridges 522 and 524 provide interfaces for additional PCI buses 526 and 528, from which additional modems or network adapters may be supported. In this manner, server 500 allows connections to multiple network computers. A memory mapped graphics adapter 530 and hard disk 532 may also be connected to I/O bus 512 as depicted, either directly or indirectly.

Those of ordinary skill in the art will appreciate that the hardware depicted in FIG. 5 may vary. For example, other peripheral devices, such as optical disk drives and the like, also may be used in addition to or in place of the hardware depicted. The depicted example is not meant to imply architectural limitations with respect to the present invention.

Data processing system 500 may be implemented as, for example, an AlphaServer GS1280 running a UNIX® operating system. AlphaServer GS1280 is a product of Hewlett-Packard Company of Palo Alto, Calif. "AlphaServer" is a trademark of Hewlett-Packard Company. "UNIX" is a registered trademark of The Open Group in the United States and other countries With reference now to FIG. 6, a block diagram of a data processing system in which the present invention may be implemented is illustrated. Data processing system 600 is an example of a client computer, such as any one of clients 110 and 112 in FIG. 1. The client software for the monitoring system of the present invention may be implemented on data processing system 600. Data processing system 600 employs a peripheral component interconnect (PCI) local bus architecture. Although the depicted example employs a PCI bus, other bus architectures, such as Micro Channel and ISA, may be used. Processor 602 and main memory 604 are connected to PCI local bus 606 through PCI bridge 608. PCI bridge 608 may also include an integrated memory controller and cache memory for processor 602. Additional connections to PCI local bus 606 may be made through direct component interconnection or through add-in boards. In the depicted example, local area network (LAN) adapter 610, SCSI host bus adapter 612, and expansion bus interface 614 are connected to PCI local bus 606 by direct component connection. In contrast, audio adapter 616, graphics adapter 618, and audio/video adapter (A/V) 619 are connected to PCI local bus 606 by add-in boards inserted into expansion slots. Expansion bus interface 614 provides a connection for a keyboard and mouse adapter 620, modem 622, and additional memory 624. In the depicted example, SCSI host bus adapter 612 provides a connection for hard disk drive 626, tape drive 628, CD-ROM drive 630, and digital video disc read only memory drive (DVD-ROM) 632. Typical PCI local bus implementations will support three or four PCI expansion slots or add-in connectors.

Figure 6:
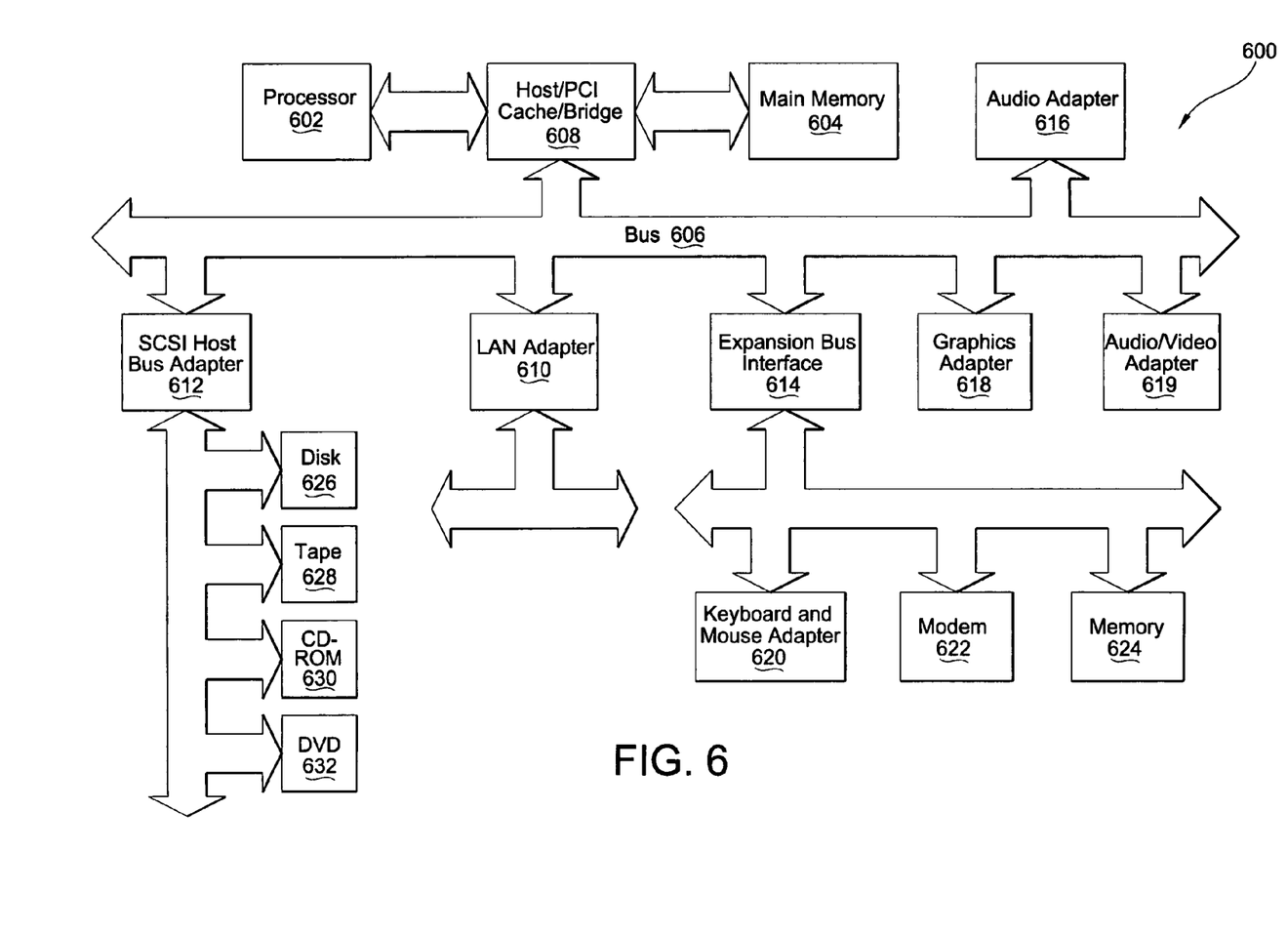
FIG. 6 depicts a block diagram of a data processing system in which the present invention may be implemented.

An operating system runs on processor 602 and is used to coordinate and provide control of various components within data processing system 600 in FIG. 6. The operating system may be a commercially available operating system, such as Windows XP, which is available from Microsoft Corporation of Redmond, Wash. "Windows XP" is a trademark of Microsoft Corporation. An object oriented programming system, such as Java, may run in conjunction with the operating system, providing calls to the operating system from Java programs or applications executing on data processing system 600. Instructions for the operating system, the object-oriented operating system, and applications or programs are located on a storage device, such as hard disk drive 626, and may be loaded into main memory 604 for execution by processor 602.

Those of ordinary skill in the art will appreciate that the hardware in FIG. 6 may vary depending on the implementation. For example, other peripheral devices, such as optical disk drives and the like, may be used in addition to or in place of the hardware depicted in FIG. 6. The depicted example is not meant to imply architectural limitations with respect to the present invention. For example, the processes of the present invention may be applied to multiprocessor data processing systems.

Figure 7:
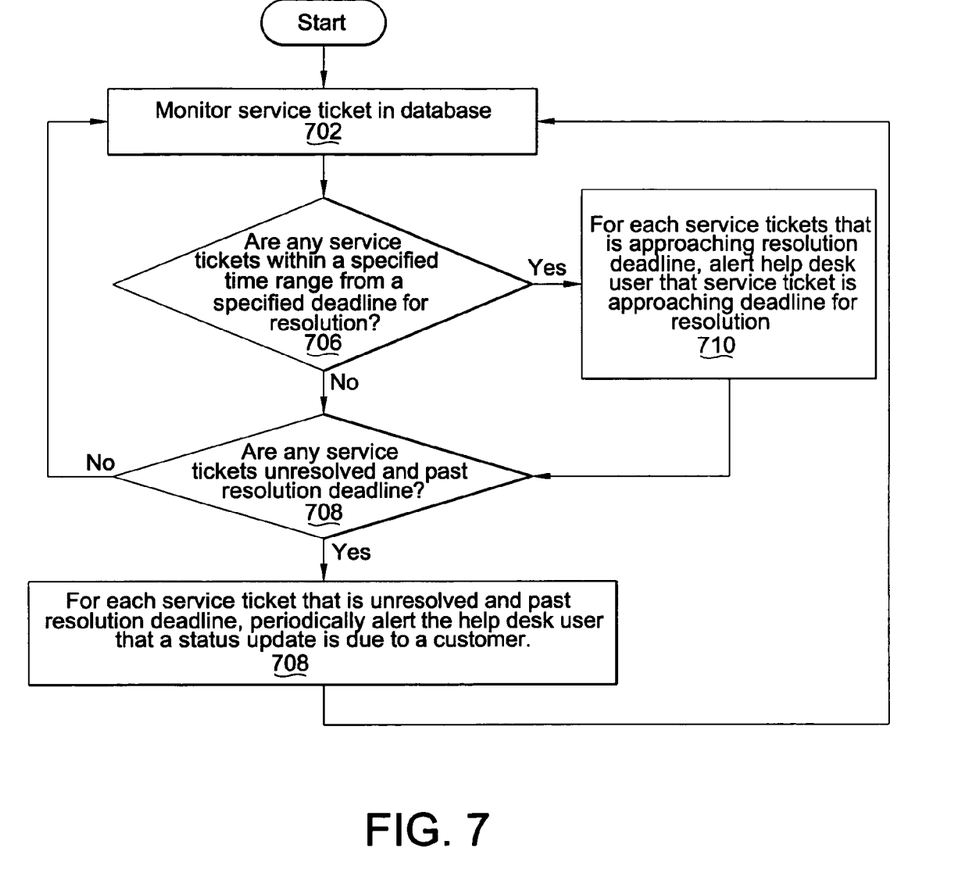
FIG. 7 depicts a diagram illustrating a high level process flow and program function for the service ticket monitoring system in accordance with one embodiment of the present invention.

With reference now to FIG. 7, a diagram illustrating a high level process flow and program function for the service ticket monitoring system is depicted in accordance with one embodiment of the present invention. The service or problem ticket monitoring service, such as the monitoring service described in FIG. 1, monitors service tickets in a database (step 702). The monitor service determines whether there are any service tickets that are within a specified time range from a specified deadline for resolution (step 706). If there are one or more tickets that are within a specified time range from a deadline for resolution, for each ticket that is approaching resolution deadline, an alert will be sent to a help desk user that the appropriate service tickets are approaching their deadline for resolution (step 710). For example, in one embodiment, a ticket that is within 75% of the deadline, as determined by the service level agreement, for resolving the ticket will have an alert sent to a helpdesk user. The helpdesk user is then responsible for reminding the appropriate service engineer or maintenance that the deadline for resolving the problem is approaching.

The monitor service also determines whether there are any service tickets that are unresolved and which have past their deadline for resolution (step 708). If there are no unresolved service tickets, the monitoring service resumes monitoring service tickets in the database (step 702). If there are unresolved service tickets that have past the deadline for resolution, the monitoring service, for each service ticket that is unresolved and past resolution deadline, periodically alerts the help desk user that a status update is due to a customer until the ticket has been resolved (step 712). For example, a service level agreement may specify that the customer must be updated every 30 minutes after a deadline for resolving a service ticket is missed until the service ticket problem is resolved.

A detailed list of requirements for a specific implementation of the monitoring system is now provided. However, this implementation is provided merely as an example and not as a limitation of the present invention. Those skilled in the art will recognize many other methods of implementing the present invention.

In this specific embodiment, requirements will be listed for monitoring the exemplary ticket types listed in the following table:

| | | |
|---|---|---|
| SpecIOC-00 (No LOS) | SpecIOC-02 (Bronze) | SpecIOC-04 (Bronze) |
| SpecIOC-01A Maj Sys Out (Bron) | SpecIOC-02 (Gold) | SpecIOC-04 (Gold) |
| SpecIOC-01A Maj Sys Out (Gold) | SpecIOC-02 (Plat) | SpecIOC-04 (Plat) |
| SpecIOC-01A Maj Sys Out (Plat) | SpecIOC-02 (Silver) | SpecIOC-04 (Silver) |
| SpecIOC-01A Maj Sys Out (Silv) | SpecIOC-03 (Bronze) | SpecIOC-CMR |
| SpecIOC-01B Maj Sys Out (Bron) | SpecIOC-03 (Gold) | SpecIOC-User Access (Bron) |
| SpecIOC-01B Maj App Out (Gold) | SpecIOC-03 (Plat) | SpecIOC-User Access (Gold) |
| SpecIOC-01B Maj App Out (Plat) | SpecIOC-03 (Silver) | SpecIOC-User Access (Plat) |
| SpecIOC-01B Maj App Out (Silv) | | SpecIOC-User Access (Silv) |

In some embodiments, certain ticket types are not monitored due to the fact that different service agreements may have differing requirements and differing determinations as to what things may be important. In this embodiment, the alert program will monitor tickets based on the "Severity" in bold font above. Normal font severity's will not be monitored.

A. Grid—The grid will refresh automatically after the user initially clicks on Get Tickets. So after the user initially clicks on "Get Tickets", the program will check if a new ticket needs to be displayed periodically (e.g., every five minutes). If a new ticket is found, a new record will appear on the grid automatically.

The grid will display ticket types that match what the helpdesk user selected. The grid will display prewarn tickets once it reaches 75%, regardless if a status update was done or not. This is to alert the helpdesk that a ticket is reaching due date and could possibly exceed due date. The grid will display all IOC tickets that have past due date. Grid will not display tickets under suspension regardless if its in prewarn or status mode.

A suspension is when the help desk agent stops the service clock temporarily. An example might be because of a customer hold up. So if a customer is traveling for two days, it would not be fair to penalize the IT provider because of the customer's unavailability. Thus, the help desk agent suspends the ticket. A trigger will update the LOSAlarm table by setting a Boolean flag, and the monitoring service will ignore that ticket. Once it is resumed, it will reappear on the grid, and the due date will be calculated from the point it was resumed.

B. Pop-up messages—Only one pre-warning message will be sent to help desk users for tickets that have reached 75% of LOS expiration (for prewarn and status tickets) regardless if a status activity was performed or not. This is to alert the helpdesk that a ticket is reaching due date and could possibly exceed due date.

Pop up messages will only occur for ticket types selected by the user. The alert window must pop up on top of all other active windows. These windows will remain showing until the user clicks 'OK'. The grid will refresh once the pop ups occur.

C. Recalc status/solve by—Recalculate the time for a status/solve by if ticket has its severity reassigned or resumed from a suspension.

D. Timing of auto-notifications—'Pre-warn' and 'status updates' notifications will be displayed for tickets with severities in green-font (above). Pre-warning alert will be sent once LOS expiration reach 75% and when status updates reach 75% (+/−3% see assumption list) of the LOS due date.

E. Suspension (Prewarn Mode)—Refer to the determine time for resolution field for correct due date when ticket is resumed.

(Status Mode)—Halt any auto notifications. Once suspension is lifted, start sending auto-notifications. The time for the next update will be calculated fresh, from the minute suspension is lifted (no minutes carried over before suspension). (i.e., If a ticket was opened at 2:30 pm, and status by is 4:30 pm, (status frequency of 2 hrs), but a suspension is placed and resumed at 3:14 pm, the next status update that is due will be 5:15 pm).

E. Status Activity Update—If a 'Status Provided' activity is found between the status update time period, no auto-notification will be sent to the helpdesk user (for tickets in 'status' mode, not prewarn).

If a 'Status Provided' activity is added within the status update time period, the alert program will recalculate the next window for a required status update (starting from the time of the last status update activity was entered). i.e., LOS for ticket expires at 1:00 pm, and ticket requires 2 hr status frequency updates. Helpdesk user must status user between 1-3 pm. If helpdesk places call at 2:15 pm, follow-up status call will be calculated to occur between 2:15-4:15 pm.

F. Data contained in alert window

Pre-warn—

Actual time ticket will miss LOS if it is not resolved
Time left before LOS expiration occurs
Ticket #
Asset #
Severity
Time/Date that window popped up
Group
Assigned Status update—

Time of last update
The time range that the user has to call customer
The frequency that they need to contact the customer (every 2 hrs, 4 hrs, etc.)
Ticket #
Asset #
Severity
Time/Date that window popped up
Group
Assigned G. Log Historic Info—Need a history of all notifications as they occur (which stores the information that was displayed on the screen). This will be used for auditing purposes. Therefore, if someone says they didn't get a notification, we can go back and see if one was sent. The information will be stored in an Oracle table and can be retrieved by ACM developer for the time being. Information that will be stored is:

Ticket No.,
Prewarn or status mode,
Actual message sent
Date message was sent.
H. Sound—Include sound effect when alert pop up occurs.
I. Multiple Windows—Need to ensure that multiple windows will be able to be displayed on the screen at one time.
J. Radio Buttons for ticket type—Include an area where a user can click on a radio button to refresh ticket display. (i.e., click on the Xtranet radio button then "Refresh" to display all Xtranet tickets).
K. Different 'status types' for tickets
Pre-warn=Warning 'Set when a ticket has not passed the due date
Past LOS=Critical 'Set immediately after a ticket has past due date
Past LOS & Requiring Status=Critical/Status 'Set once a ticket has reached the 75% mark for a ticket past LOS.

Also, in this embodiment, there are three customizable oracle tables referred to as cuLOSAlarm, cuLOSAlarmMatrix, and cuLOSAlarmHistory. The cuLOSAlarm table is the main driver table the client program reads off of. It contains all tickets that have been created with a severity that is to be tracked (exists in cuLOSMatrix) until it is canceled or closed. The server program will make necessary updates to these records depending on which stage the ticket is at (75% of prewarn, just passed the due date, 75% of the status point). The cuLOSAlarmMatrix table contains all of the severities that are to be monitored by the LOS Watchdog program. It contains the appropriate resolution times to fix a problem with a severity, the necessary status frequency when a ticket has LOS etc. The cuLOSAlarmHistory table ensures that every time a helpdesk user receives an autonotification pop-up message on their computer, an Insert into this table is performed from the client pc. The message and the computer name is stored in this table. Anyone could query against this ticket by ticket number and determine if an alert message was sent to a user.

There are two program types in this embodiment, the server program and the client program. The server program resides in, for example, an NT server. The program runs every 60 seconds and updates any tickets that exist in the cuLOSAlarm table that have bsuspension=0. Bsuspension=0 represents tickets that are NOT suspended. The server program loops through all of theses tickets and updates certain fields.

If a problem or an error occurs, the India and US on call pager will receive a page. The US pager will contain a full detailed description of the error, but the India pager will contain a brief message stating an error has occurred in LOS WatchDog and to check the log file. Log files exist in, for example, AS45NT C:\ProgramFiles\LOSWatchDog\Watchdog.log There is an option to turn debugging on to view more detailed information if necessary. To turn debugging on, remote control into AS45NT, maximize the LOS WatchDog program, and click on the button that says "Turn debug on". Do no leave the debug option on too long! Dbg file will grow to a large file size. The debug file resides in C:\ProgramFiles\LOSWatchDog\WatchDog.dbg.

During normal maintenance windows, the program will terminate at Sat 2:55 am. On extended maintenance windows, the program will terminate at Sat 12:05 am. Once 5:00 am arrives, the program starts up again through a WINAT scheduled entry. Any tickets that require updates during the db maintenance window will be updated once the program resumes checking (5:00 am).

Regarding the client program, the client user needs to ensure they have an appropriate ODBC connection established in order to use the program. If they do not have an ODBC connection, provide them with the LOS WatchDog Instruction.doc in the LOSWathcDog folder in Dimensions. This instructions document contains everything a user needs to install the program.

The grid displays numerous columns . . . most of which are self explanatory. If a ticket is displayed on the grid, that means either a ticket is 75% of approaching its due date, OR its missed the due date (in other words, just because a ticket is created with a severity that exists in the cuLOSAlarmMatrix, the record will NOT automatically appear on the grid unless one of the two conditions listed above occurs.

There is an option for the helpdesk agents to view IOC or Xtranet tickets. Depending on which option they choose, those are the only alerts that will be displayed on their screen and grid. For example, if they have Xtranet selected, the helpdesk user will only see alert pop up messages and grid information pertaining to Xtranet.

In this embodiment, the grid will include at least two columns, status, and dtsatussolveby. The explanations for these columns are provided below:

Status: This can be 1 of 3 values
WARNING: We call these tickets (prewarn). They have not expired but are approaching the expiration due date. The helpdesk agent needs to do something to prevent missing LOS.
CRITICAL: We call these tickets (status mode). They have past LOS and were not closed by its due date. The helpdesk needs to status the customer every so often (look at the cuLOSAlarmMatrix for more info).
CRITICAL STATUS: We call these tickets (status mode as well). They are past LOS and are past the 75% mark of a necessary status update. The status update is an activity in Asset Center with a nature='Status Update'. Once a user provides a status update, the status field will be updated by the LOSWatchDog Server program and set it back to CRITICAL status.

Dtstatussolveby: Represents the date and time in which a user should perform some action depending on the status column. If the ticket has a WARNING status, the dtstatussolveby time represents 75% of the due date. If the ticket is in CRITICAL status, then the dtstatussolveby represents the 75% of the status point.

The client program will only monitor tickets with a severity that exist in the cuLOSAlarmMatrix table. If a ticket has a severity that is within cuLOSAlarmMatrix, watchdog will insert a record into cuLOSAlarm and monitor that ticket. The client program has a grid that displays records if:
A ticket is in prewarn mode (ticket that has not past its due date), not suspended, and past 75% of its due date
A ticket that has past LOS due date (status mode) and not suspended.
A (only one) pop up message will appear on the client machine when a ticket has reached 75% of its due date and is in prewarn mode. A pop up message will also appear when a ticket reaches 75% of its status update point (status mode). When the helpdesk user adds a diary entry with a nature="status update" for tickets that are past LOS (status mode), then the dtstatussolveby time recalculates and the status field is changed to CRITICAL.

If the user does not click on "OK" when a pop up message appears, the program will not continue checking for tickets/updates. The program is an event driven program and will wait for the user to acknowledge and respond to the pop-up message. Once the user responds by clicking OK, the program returns to checking for tickets and updates the grid with the appropriate updates.

The client program is designed to run in synchronization with the database clock. The program will check for updates every 5 minutes . . . so the helpdesk agent does not need to consistently click on 'Get Tickets' to update the grid. The updates will occur when the minute hand lies on a 0 or a 5 (e.g., 12:30, 1:55, 8:30, 8:35, etc.). The synchronization does not occur at the local pc time, instead it occurs at the db time. This is to synchronize all helpdesk machines and force an alert message at the same time.

Lastly, pop up messages will appear if the dtstatussolveby falls within a 5 minute range of the db clock. For example, if the time is 12:35 pm, the client program will search for any tickets that fall within 12:30-12:35 pm. The next five minutes that passes, the program will look for tickets that have a dtstatussolveby between 12:35-12:40 pm. So if a ticket has a dtstatussolveby time of 12:43 pm, then a pop up message will not be delivered until 12:45 pm . . . at that time, all tickets with a dstatussolveby between 12:45-12:40 pm are selected and processed.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links. The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a computer system, for monitoring service tickets for information technology service providers to ensure that levels of service required to be provided to a customer pursuant to a contractual agreement between the customer and a service provider, are met, the method comprising:
   inspecting a service ticket in a database to determine a deadline for when a problem associated with the service ticket must be resolved, with the deadline based upon a contractually determined severity of the problem and a corresponding contractually required time for resolution of the problem;
   displaying, on a display device at the help desk, a graphical display populated with representations of service tickets that have reached a predetermined percentage of the time before their due date;
   determining a deadline approaching alert time at which a help desk user must be notified that the deadline for resolving the problem must be met; and
   alerting the help desk user that the deadline for resolving the problem is approaching when the deadline approaching alert time is reached.

2. The method as recited in claim 1, further comprising:
   determining a status update interval for the service ticket; and
   responsive to a determination that the problem has not been resolved by the deadline, determining a first status update alert time to alert the help desk user that a status update needs to be sent to the customer.

3. The method as recited in claim 2, further comprising:
   alerting the help desk user that a status update is approaching when the first status update alert time occurs.

4. The method as recited in claim 3, further comprising:
   responsive to a determination that the problem has not been resolved after a status update time has passed, determining a time to alert the help desk user that a time to provide a new status update to the customer is approaching and alerting the help desk user prior to the time to provide the new status update.

5. The method as recited in claim 1, wherein alerting the help desk user that the deadline for resolving the problem is approaching when the deadline approaching alert time is reached comprises sending an alert wherein the alert includes an identity of the service ticket and the deadline for when a problem associated with the service ticket must be resolved.

6. The method as recited in claim 5, wherein the alert comprises a pop-up window.

7. The method as recited in claim 6, wherein the pop-up window is displayed on top of all other windows that are open on the help desk user's data processing system.

8. The method as recited in claim 5, wherein the alert comprises an audio alert.

9. The method as recited in claim 5, wherein the alert comprises a graphical alert.

10. The method as recited in claim 1, wherein the deadline for when a problem associated with the service ticket must be resolved is determined by consulting a ticket severity table.

11. The method as recited in claim 10, wherein the ticket severity table is populated in accordance with a level of service agreement between the customer and the information technology provider.

12. A computer program product in a non-transitory computer readable media for use in a data processing system for monitoring service tickets for information technology service providers to ensure that levels of service required to be provided to a customer pursuant to a contractual agreement between the customer and a service provider, are met, the computer program product comprising:
   first instructions for inspecting a service ticket in a database to determine a deadline for when a problem associated with the service ticket must be resolved, with the deadline based upon a contractually determined severity of the problem and a corresponding contractually required time for resolution of the problem;
   display instructions for displaying, on a display device at the help desk, a graphical display populated with representations of service tickets that have reached a predetermined percentage of the time before their due date;
   second instructions for determining an deadline approaching alert time at which a help desk user must be notified that the deadline for resolving the problem must be met; and third instructions for alerting the help desk user that the deadline for resolving the problem is approaching when the deadline approaching alert time is reached.

13. The computer program product as recited in claim 12, further comprising:
   fourth instructions for determining a status update interval for the service ticket; and fifth instructions, responsive to a determination that the problem has not been resolved by the deadline, for determining a first status update alert time to alert the help desk user that a status update needs to be sent to the customer.

14. The computer program product as recited in claim 13, further comprising:
sixth instructions for alerting the help desk user that a status update is approaching when the first status update alert time occurs.

15. The computer program product as recited in claim 14, further comprising:
seventh instructions, responsive to a determination that the problem has not been resolved after a status update time has passed, for determining a time to alert the help desk user that a time to provide a new status update to the customer is approaching and alerting the help desk user prior to the time to provide the new status update.

16. The computer program product as recited in claim 12, wherein alerting the help desk user that the deadline for resolving the problem is approaching when the deadline approaching alert time is reached comprises sending an alert wherein the alert includes an identity of the service ticket and the deadline for when a problem associated with the service ticket must be resolved.

17. The computer program product as recited in claim 16, wherein the alert comprises a pop-up window.

18. The computer program product as recited in claim 17, wherein the pop-up window is displayed on top of all other windows that are open on the help desk user's data processing system.

19. The computer program product as recited in claim 16, wherein the alert comprises a graphical alert.

20. The computer program product as recited in claim 12, wherein the deadline for when a problem associated with the service ticket must be resolved is determined by consulting a ticket severity table.

21. The computer program product as recited in claim 20, wherein the ticket severity table is populated in accordance with a level of service agreement between the customer and the information technology provider.

22. A system for monitoring service tickets for information technology service providers to ensure that levels of service required to be provided to a customer pursuant to a contractual agreement between the customer and a service provider, are met, the system comprising:
first means for inspecting a service ticket in a database to determine a deadline for when a problem associated with the service ticket must be resolved, with the deadline based upon a contractually determined severity of the problem and a corresponding contractually required time for resolution of the problem;
display means for generating a display, on a display device at the help desk, a graphical display populated with representations of service tickets that have reached a predetermined percentage of the time before their due date;
second means for determining an deadline approaching alert time at which a help desk user must be notified that the deadline for resolving the problem must be met; and
third means for alerting the help desk user that the deadline for resolving the problem is approaching when the deadline approaching alert time is reached.

23. The system as recited in claim 22, further comprising:
fourth means for determining a status update interval for the service ticket; and
fifth means, responsive to a determination that the problem has not been resolved by the deadline, for determining a first status update alert time to alert the help desk user that a status update needs to be sent to the customer.

24. The system as recited in claim 23, further comprising:
sixth means for alerting the help desk user that a status update is approaching when the first status update alert time occurs.

25. The system as recited in claim 24, further comprising:
seventh means, responsive to a determination that the problem has not been resolved after a status update time has passed, for determining a time to alert the help desk user that a time to provide a new status update to the customer is approaching and alerting the help desk user prior to the time to provide the new status update.

26. The system as recited in claim 22, wherein alerting the help desk user that the deadline for resolving the problem is approaching when the deadline approaching alert time is reached comprises sending an alert wherein the alert includes an identity of the service ticket and the deadline for when a problem associated with the service ticket must be resolved.

27. The system as recited in claim 26, wherein the alert comprises a pop-up window.

28. The system as recited in claim 27, wherein the pop-up window is displayed on top of all other windows that are open on the help desk user's data processing system.

29. The system as recited in claim 26, wherein the alert comprises an audio alert.

30. The system as recited in claim 22, wherein the deadline for when a problem associated with the service ticket must be resolved is determined by consulting a ticket severity table.

31. The system as recited in claim 30, wherein the ticket severity table is populated in accordance with a level of service agreement between the customer and the information technology provider.

32. A system for monitoring service tickets in order to provide reminders to a help desk user of impending times for actions, the times for actions being provided according to a level of service required to be provided to a customer pursuant to a contract between the customer and a service provider, the system comprising:
a monitoring server;
a database; and
a help desk client;
wherein the database stores tickets and information regarding ticket types, ticket severities based on the contract, and corresponding contractually required times for actions to be performed for each of the ticket types and ticket severities; the monitoring server monitors tickets in the database, determines when times for actions are approaching, and sends alerts to the help desk client alerting the help desk user that a time to take a specified action is approaching; and the help desk client displays active tickets to a help desk user and provides alerts received from the monitoring server to the help desk user.

33. The system as recited in claim 32, wherein the times are determined using a centralized clock.

34. The system as recited in claim 32, wherein the active tickets are displayed in a grid.

35. The system as recited in claim 32, wherein the active tickets displayed are only those that have reached a predetermined percentage of the time before their due date.

36. The system as recited in claim 35, wherein the percentage of time is 75% of the time specified in an associated LOS.

37. The system as recited in claim 35, wherein the display may be minimized at the election of the user.

* * * * *